(12) United States Patent
Naghian et al.

(10) Patent No.: US 7,567,528 B2
(45) Date of Patent: Jul. 28, 2009

(54) COMMUNICATIONS SYSTEM

(75) Inventors: Siamäk Naghian, Espoo (FI); Petri Jolma, Nurmijärvi (FI)

(73) Assignee: Nokia Corporation, Espoo (FI)

( * ) Notice: Subject to any disclaimer, the term of this patent is extended or adjusted under 35 U.S.C. 154(b) by 468 days.

(21) Appl. No.: 11/342,872

(22) Filed: Jan. 31, 2006

(65) Prior Publication Data

US 2006/0193286 A1    Aug. 31, 2006

(30) Foreign Application Priority Data

Jan. 31, 2005    (GB)    ................. 0501973.2

(51) Int. Cl.
*H04W 4/00*    (2006.01)
(52) U.S. Cl. ....................... 370/328; 370/344
(58) Field of Classification Search .................. None
See application file for complete search history.

(56) References Cited

U.S. PATENT DOCUMENTS 5,150,361 A * 9/1992 Wieczorek et al. .......... 370/311

2002/0136291 A1    9/2002 Sala et al.

FOREIGN PATENT DOCUMENTS

| EP | 1480353 | 11/2004 |
|---|---|---|
| GB | 2300337 | 10/1996 |

OTHER PUBLICATIONS

International Search Report for International Application No. PCT/IB2006/000750, filed Jan. 31, 2006.

* cited by examiner

*Primary Examiner*—Erika A Gary
(74) *Attorney, Agent, or Firm*—Squire, Sanders & Dempsey L.L.P.

(57) ABSTRACT

A communications network for transferring communication frames between a base station and a plurality of subscriber stations. Each frame having sets of information and control messages, wherein at least some of the control messages allocate which set of information corresponds to which subscriber station. The overhead of the control messages being reduced.

15 Claims, 6 Drawing Sheets

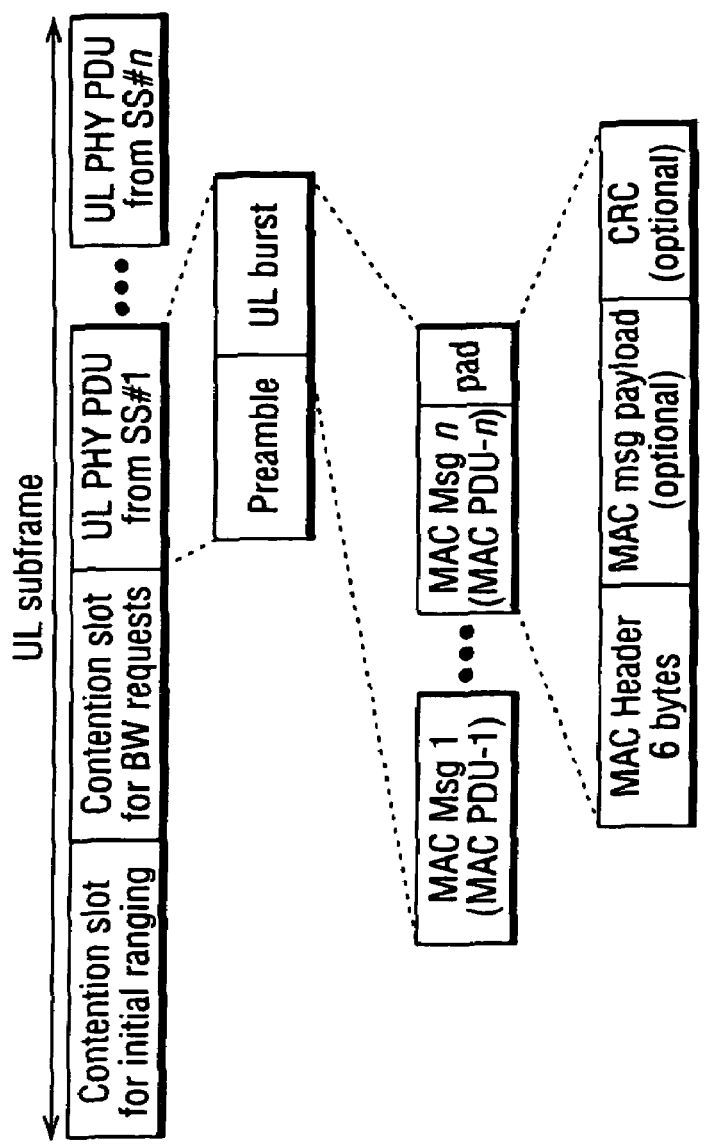
FIG. 2b (Contd.)

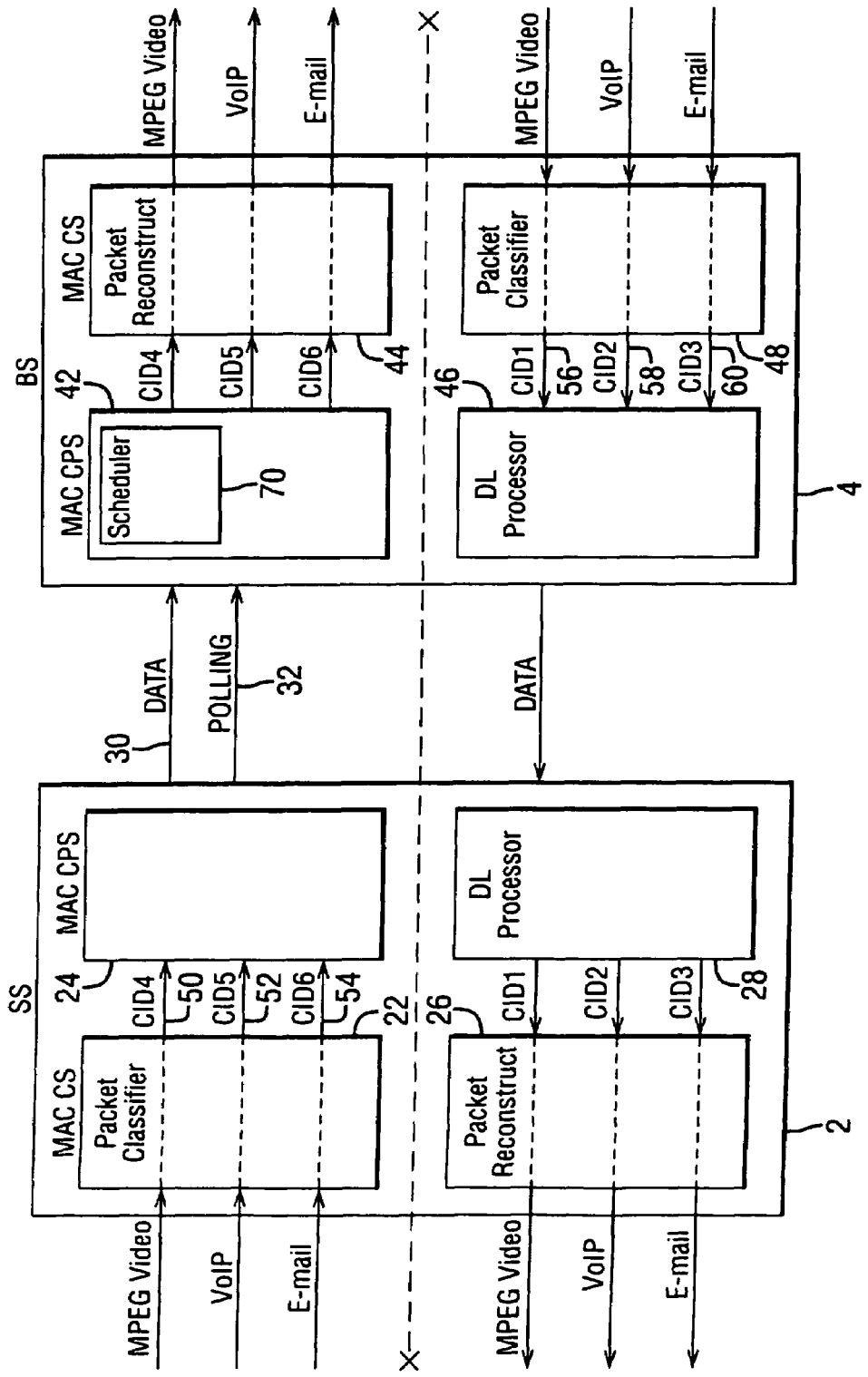

COMMUNICATIONS SYSTEM

The present invention is concerned with a communication network for transferring information between a subscriber station and a base station, and in particular but not exclusively with the transfer of control messages between the subscriber station and the base station.

The growth of telecommunications has evolved from traditional voice and data communications to more bandwidth-intensive applications such as multimedia, video, etc. Traditionally, the bottleneck in communicating this information is known as the so-called "last mile", which is the consumer broadband problem. Broadly speaking a communication network can be thought of as comprising a consumer part and a network part. The network part is normally a hierarchical grouping of data streams which enables high bandwidth communications to be transmitted between various centres of a communication network. In contrast, the last mile (or the consumer part of the network) is the set of connections that branch out from the local network centre to each of the consumers.

The bottleneck associated with the last mile is even more apparent in mobile/cellular networks, which traditionally rely on narrowband data communications. Recently, so-called Wi-Fi networks have been introduced with the intention of providing high bandwidth radio communications to both fixed and mobile consumers. However, advances in radio frequency technology have driven the IEEE 802.16 standard which basically tries to achieve the high bandwidth of Wi-Fi networks using mobile communication networks. Though the original purpose of the IEEE 802.16 standard was to provide interoperable standards for Point-to-Multipoint (PmP) back haul networks, the standard has been recently enhanced to cater for FWBA (Fixed Broadband Wireless Access) networks thereby providing high bit rates for users in hot spots, SOHO (small office/home office), residential, etc. Furthermore, enhancements have been made to develop the standards in being able to support a fully mobile BWA system.

Thus, the original intention and features of the FBWA system need to be enhanced to meet the more stringent requirements of mobile BWA networks.

In particular, there are certain disadvantages which have been identified in relation to the control channel of the IEEE 802.16 standard. Presently, a significant portion of the PHY (physical) frame of the IEEE 802.16 standard is occupied by too long or heavy control messages. This disadvantage becomes even more acute in the mobile environment when control information is likely to be transferred more frequently over the air interface due to the dynamic behaviour of the radio channel.

A further disadvantage associated with control messages of the IEEE 802.16 standard is that because of their long and cumbersome structure they are extremely prone to errors, which results in degraded system performance.

It is an object of an embodiment of the present invention to provide an improved system for transferring control messages that overcomes the aforementioned disadvantages.

According to one aspect of the present invention there is provided a communications network for transferring communication frames between a base station and a plurality of subscriber stations, each frame having sets of information and control messages, wherein at least some of the control messages allocate which set of information corresponds to which subscriber station, and wherein at least one of the control messages is a code which allocates the location of the sets of information within each frame and also the number of frames for which the allocation is to be repeated.

According to another aspect of the present invention there is provided a communications network for transferring communication frames between a base station and a plurality of subscriber stations, each frame having sets of information and selectively having control messages, wherein at least some of the control messages allocate which set of information corresponds to which subscriber station, and wherein the control messages are only sent in those frames whose sets of information change.

According to a further aspect of the present invention there is provided a communications network for transferring communication frames between a base station and a plurality of subscriber stations over a plurality of channels, each frame having sets of information and control messages, wherein at least some of the control messages allocate which set of information corresponds to which subscriber station, and wherein the quality of the channels are monitored so that the control messages are sent over the channel with the best quality.

According to yet another aspect of the present invention there is provided a communications network for transferring communication frames between a base station and a plurality of subscriber stations, each frame having sets of information and control messages, wherein at least some of the control messages allocate which set of information corresponds to which subscriber station, and wherein the control messages each have an original content of a particular size which is condensed by replacing the original content with an index of smaller size.

Embodiments of the present invention will now be described by way of example only with reference to the accompanying drawings, in which:

FIG. 4 shows a QoS example according to an embodiment of the present application.

Broadly speaking, the IEEE 802.16 standard can be divided into two frequency bands of interest. Firstly, frequencies in the 10-66 GHz band in which LOS (line-of-sight) is required. This environment is well suited for SOHO or medium to large office applications.

Secondly, frequencies below 11 GHz provide a physical environment where due to the longer wavelength, LOS (line-of-sight) is not necessary and multipath defects may be significant. The ability to support NLOS (non-line-of-sight) situations requires additional PHY functionality. It should be appreciated that the present invention finds particular application in the second frequency band, i.e. below 11 GHz.

Figure 1:
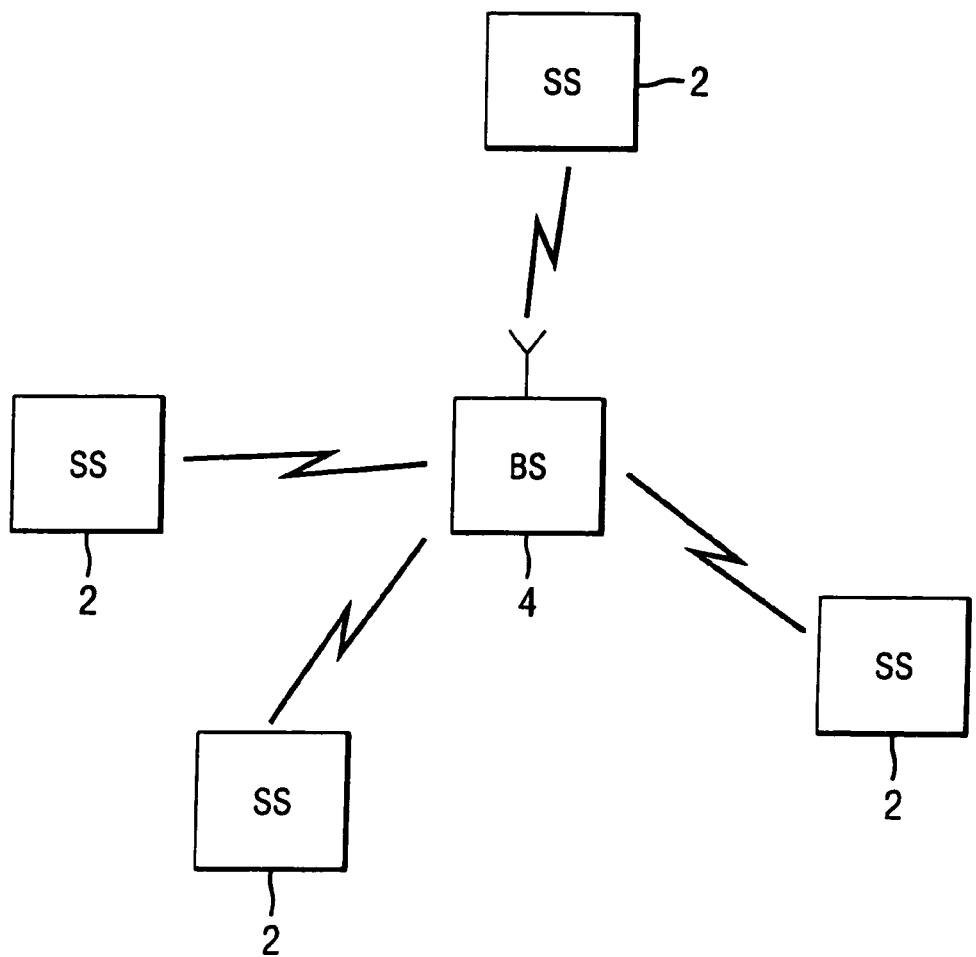
FIG. 1 shows a basic wireless access network according to an embodiment of the present application.

FIG. 1 shows a basic implementation of the IEEE 820.16 standard which consists of a base station BS 4 and a plurality of subscriber stations SS 2. Thus, the IEEE 820.16 standard provides an air interface for BWA systems wherein all data traffic is transferred to the BS, which is able to control the allocation of bandwidth for particular radio channels. This means, that the IEEE 820.16 standard is a bandwidth-on-demand system, which enables various radio connections to be established depending on the QoS (quality of supply) requirements of a particular application which a SS 2 may be using. For example, if a particular SS 2 is using a multimedia application, the QoS requirements will be quite onerous and therefore the BS 4 will have a scheduling element which will need to take into account the total demands on the network and decide whether (and how) the required bandwidth can be allocated to the relevant SS.

One of the real advantages associated with the IEEE 820.16 standard is the mobile nature of the SSs. That is, portable devices such as laptops and PDAs (personal digital systems) are able to operate as SSs thereby allowing users to connect to the network wherever they may be.

The IEEE 820.16 work group has developed standards for both the PHY and MAC (medium access control) layers. The MAC layer makes allowance for both OFDM (orthogonal frequency division multiplexing) as well as OFDMA (orthogonal frequency division multiple access).

There are different frame structures which are supported depending on whether OFDM or OFDMA is used. Furthermore, the frame structure will vary depending on the duplexing method which can either be FDD (frequency division duplexing) or TDD (time division duplexing). The frame structures are similar but in FDD the UL and DL information is transferred in independent frequency channels.

Figure 2A:
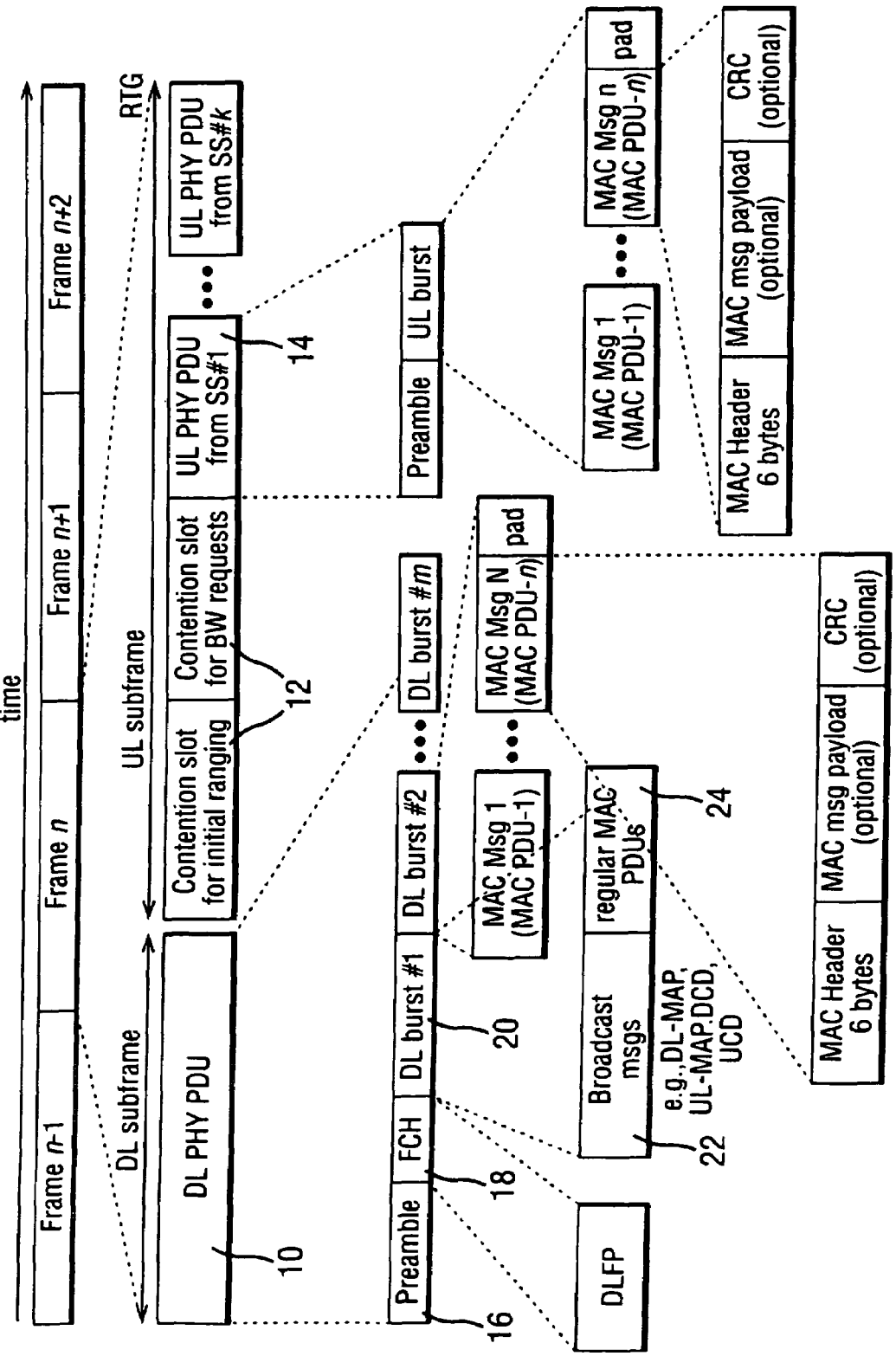
FIG. 2a shows an example of an OFDM frame structure with TDD according to an embodiment of the present application.
Figure 2B:
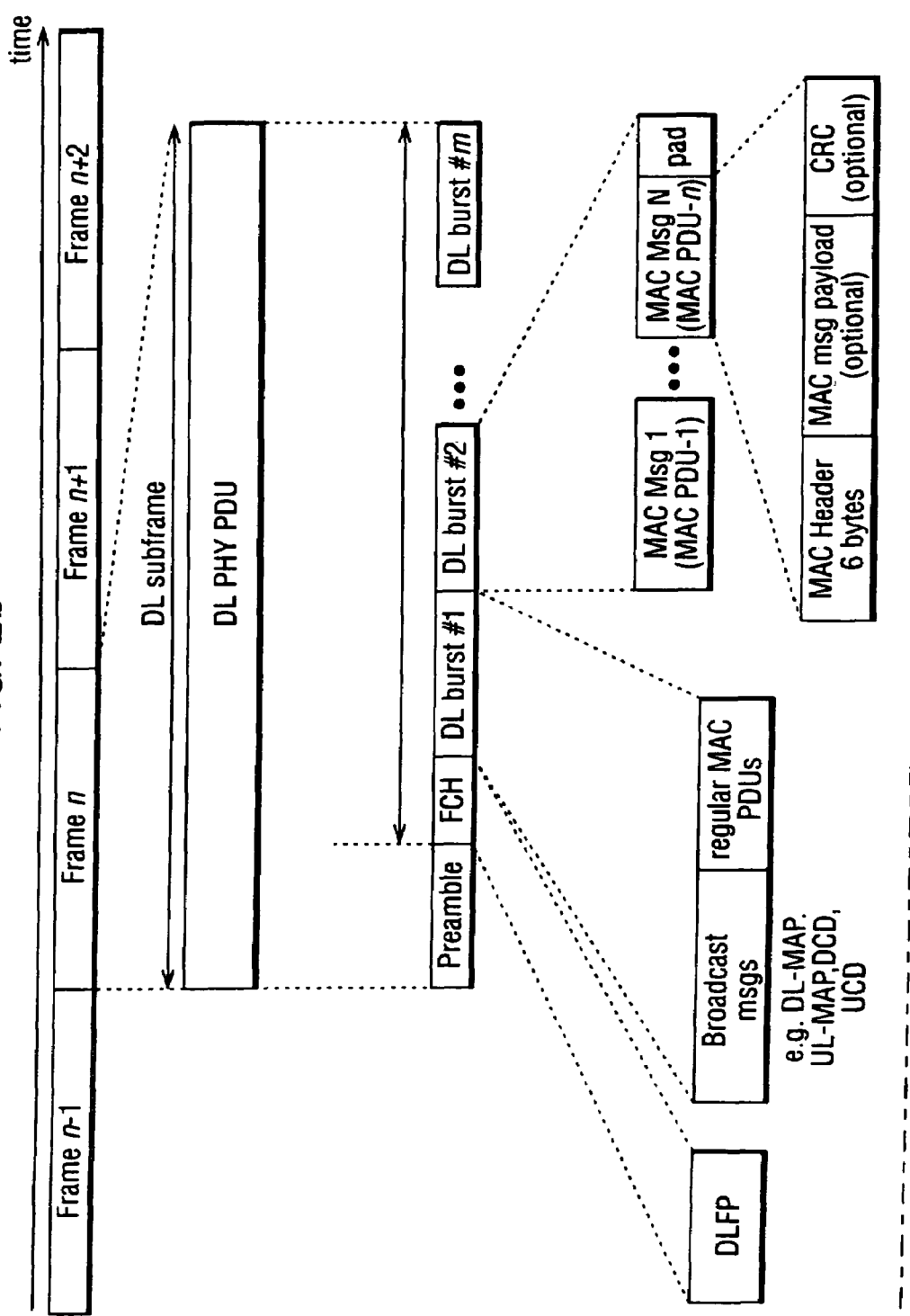
FIG. 2b shows an example of an OFDM frame structure with FDD according to an embodiment of the present application.
Figure 3:
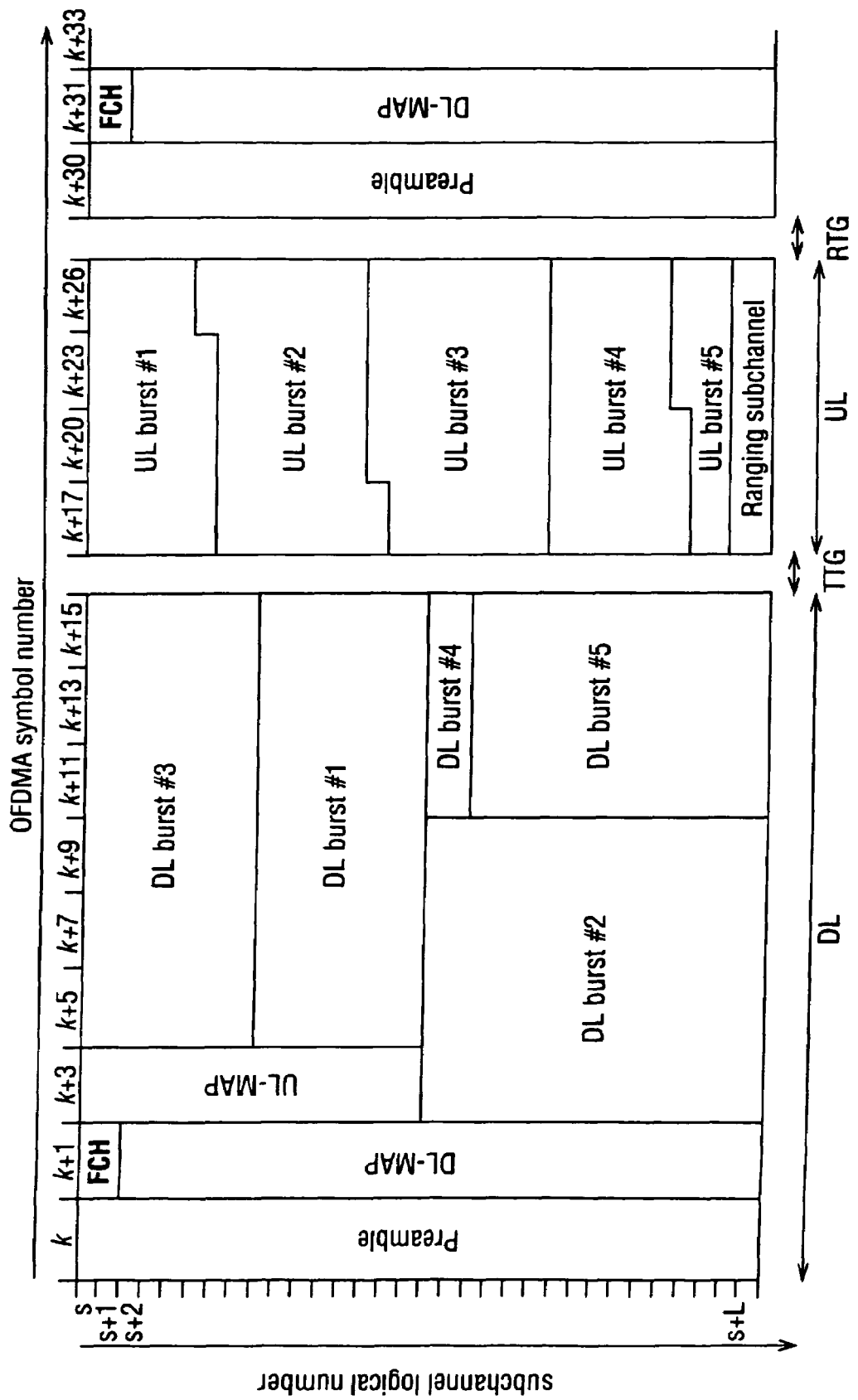
FIG. 3 shows an example of an OFDMA frame structure for one TDD frame according to an embodiment of the present application.

FIG. 2A shows an example of an OFDM frame structure with TDD whereas FIG. 2B shows and example of an OFDM frame structure with FDD. FIG. 3 shows an example of an OFDMA frame structure.

FIG. 2B differs from the frame structure in FIG. 2A in that with FDD, the DL (downlink) and UL (uplink) frame structures are similar, except that the UL and DL are transmitted on separate channels.

Thus, for the purposes of the present application the discussion will be limited to FIG. 2A, but it should be appreciated that the same principles can also be applied to other systems including FIG. 2B and FIG. 3.

In particular, FIG. 2A shows a number of frames which are transmitted, i.e. frame n−1 to frame n+2. Each physical frame is sub-divided into a DL (downlink) sub-frame and an UL (uplink) sub-frame. A DL sub-frame consists of only one downlink PHY PDU (protocol data unit) 10. In contrast, the UL sub-frame consists of contentious slots 12 and one or more uplink PHY PDUs (which are each transmitted from a different SS).

The downlink PHY PDU 10 comprises: a preamble 16, a FCH (frame control header) 18 and a plurality of DL bursts 20. The preamble is used for PHY synchronisation. The FCH burst 18 specifies the modulation/coding to be used (for example BPSK rate 1/2). It should be understood that there are differences in the content of the FCH burst in OFDM and OFMA modes. However, it is the DL bursts 20 which are of particular importance in an embodiment of the present application.

The DL burst 20 is shown to comprise a first portion for broadcast messages 22 and a second portion for regular MAC PDUs 24. The broadcast message portion is known as the control channel and various control messages can be sent on this channel. Broadly speaking, the purpose of the broadcast messages 22 is to convey information to the receiving terminal as to exactly which sets of information contained in the frame correspond to which SS terminal. Thus, the broadcast message portion can be thought of as providing allocation patterns for the sets of information grouped within the frames.

The control messages may take on a plurality of different forms, for example: DL-MAP (downlink map) which defines the burst start times for a SS on the downlink, UL-MAP (uplink map) which defines a set of information for a scheduled interval, DCD (Downlink Channel Descriptor) is a MAC control message that describes the PHY characteristics of a downlink channel, UCD (Uplink Channel Descriptor) does the same for an uplink channel, etc.

The DL-MAP message, if transmitted in the current frame, is the first MAC PDU in the burst following the FCH 18. Also, a UL-MAP (uplink map) message can be included. Moreover, a DLFP (downlink frame prefix) control message is used to define the location and profile of the first DL burst in the frame and also defines the location and profile of the maximum possible number of subsequent bursts in the frame. The location and profile of other bursts are specified in the DL-MAP.

Thus, in the current IEEE 802.16 standard every frame has a MAP message which explicitly conveys the allocation of information for a particular SS terminal. However, an embodiment of the present invention introduces a codebook which is a code that specifies not only the location of sets of information within a frame but also the duration (or number of frames) for which that allocation is to be repeated.

Thus, a SS or BS may contain scheduling circuitry (or software) which is responsible for receiving information on the control channel and from this information identifying how information is to be allocated into a frame (or read from a frame). For example, consider that the scheduler decides it is necessary for information to be allocated to a certain terminal in a frame X but which is also to be repeated in frames X+1, X+2 etc. In this way the allocated of information is not repeated in every frame, but rather an initial frame specifies how many times, and in which subsequent frames, the allocation is to be repeated.

For example, the simple pseudo-code "ABC" will be understood by the terminal to signify that information is allocated in locations X and Y of a frame for a period of N frames.

A further embodiment of the present invention reduces the overhead of control messages by reducing the frequency that such control messages are sent by only sending control messages when a certain event occurs. For example, a radio channel could be relatively constant and in such a situation, where there are no changes, it is a waste of overhead to transfer control messages. In order to optimise control message overhead, these control messages are instead only transferred when there is a change in the characteristics of the radio channel. For example, the scheduler within a BS or SS might decide to change the frame capacity allocation for a particular radio channel and therefore control messages will need to be introduced as a result of such an event.

Yet a further embodiment of the present invention is concerned with selective channelisation whereby a transmitter (i.e. either the SS or the BS depending on whether transmitting in an uplink or downlink direction) is kept aware of the status of the radio channel, for example by using a measurement control loop in the situation where a transmission is unicast.

In such a situation the scheduler (or the transmitting element) may decide to reorganise the control channel so that control messages are instead transferred on the most robust sub-channels. Robustness can be measured in various different ways for example stability, SNR (signal-to-noise-ratio), error rate, etc. This embodiment can be combined with the codebook embodiment so that the location X and Y which is allocated within a frame is determined according to the channel status information. Thus, selecting the most robust sub-channels for transmitting the information, reduces the likelihood reception errors.

Furthermore, a more robust control channel can be selected depending on the historical information associated with the feedback information, which is received.

Yet a further embodiment of the present invention is concerned with condensing the contents of control messages so as to remove unnecessary information where possible. That is, certain information bits can often be partially, or in some cases even completely, omitted.

For example, consider the situation of temporary PHY addressing based on connection identifiers (CIDs). It is useful at this stage to briefly define a CID in reference to FIG. 4. The IEEE 802.16 standard allows for QoS differentiation between applications having different bandwidth requirements. Specifically, the standard defines the following service classes:

UGS (Unsolicited Grant Services) supports CBR (Constant Bit rate) services such as VoIP (Voice over Internet Protocol).

rtPS (real-time Polling Services) supports real-time services having variable sized data packets. For example, MPEG video (Moving Picture Experts Group).

NrtPS (non-real-time Polling Services) support services which are not real-time but require variable-sized data packets.

BE (Best Effort) services as provided by the Internet, for example E-mail.

FIG. 4 shows an example of QoS differentiation for different applications. In particular, three applications are considered: MPEG video, VoIP and Email. Each application is assigned a service class by a packet classifier which is shown as forming part of the MAC CS (convergence sublayer) 22. The packet classified uses a CID (Connection identifier) to identify a connection to the equivalent peers in the MAC of the BS 4 and SS 2. The CID is a 16-bit value which maps to a SFID (Service Flow Identifier) which defines the QoS of the service flow associated with that connection.

In any event, the CIDs 50, 52 and 54 shown in the uplink direction (above the horizontal dashed lines XX) are transformed by the MAC CPS (common part sublayer) into the data frames 30 which are then transmitted to the BS 4. Within the BS 4 there is also a MAC CPS 42 containing a scheduler 70 and wherein the MAC CPS 42 recovers the various CID's. The BS 4 also has a MAC CS 44 which is able to reconstruct the various packets associated with each of the application (i.e. MPEG, VoIP, Email) from the CIDs (i.e. CID4, CID5, CID6). A similar process is shown in the downlink direction (below the horizontal dashed lines XX).

FIG. 4 also shows polling messages 32 being sent between the SS 2 and the BS 4. There are two types of polling. Unicast polling occurs when an SS is polled individually and is allocated to send bandwidth request messages. Contentious polling occurs when there is not enough bandwidth to poll individual SS so that instead a plurality of SS will compete to send a bandwidth request.

There is a further embodiment of the present invention which is concerned with removing unnecessary content (i.e. information bits) from control messages. For example, PHY addressing, CID messages, MAP messages, management messages, PHY synchronization bit, BS ID (Identity), etc. Thus the idea is to remove unnecessary information, where only the most essential control information bits are to be transferred over the radio channel. This is achieved by replacing the content of the original control message with an index having fewer bits than the original control message.

For example, consider the current IEEE 802.16 standard which specifies that CIDs are 16 bits long. Also consider an application such as browsing the Internet, which consists of page downloads of average size 100 kB. The addressing associated with targeting a stream of packets to a certain SS causes a certain addressing delay in processing and transferring the 16-bit address. The address for transmission of a web page does not need to be 16 bits long and instead an index comprising only a few bits can be used.

For example, the index could be a temporary physical address consisting of only a few bits that have the same duration as the allocation is to be repeated if such a technique is combined with the codebook embodiment.

According to the current IEEE standard it is quite likely that a typical frame will contain a large amount of extraneous information, for example CID control information (for example 6×16 bits) and also allocation information associated with each MAP message (for example 6×10s of bits).

However, the embodiments of the present application are able to reduce the control message overhead in various ways. That is, control messages can be condensed for example using an index. Also, the control information which is to be conveyed is often repetitive and the control message overhead could be considered to be reduced by using the codebook embodiment which specifies the location (of control information within each frame) and the duration (the number of times the frame is to be repeated).

It should also be appreciated that these various embodiments could be combined to even further reduce the control message overhead. For example, the indexing embodiment could be combined with the codebook embodiment to further reduce the control message overhead.

The invention claimed is:

1. An apparatus, comprising:
a base station; and
a plurality of subscriber stations, wherein the base station and the plurality of subscriber stations are configured to transfer communication frames therebetween, and
each frame configured to include sets of information and control messages,
wherein at least some of the control messages allocate which set of information corresponds to which subscriber station, and
wherein at least one of the control messages is a code which allocates the location of the sets of information within each frame and also the number of frames for which the allocation is to be repeated.

2. Apparatus comprising:
a scheduler configured to provide at least part of each of a plurality of frames, said at least part of each frame having sets of information and control messages, wherein at least some of the control messages allocate which sets of information corresponds to which one of a plurality of subscriber stations and wherein at least one of the control messages is a code which allocates the location of the sets of information within said at least part of each frame and also the number of frames for which the allocation is to be repeated.

3. Apparatus according to claim 2, wherein said at least part of said each frame comprises a downlink subframe.

4. Apparatus according to claim 3, wherein the downlink frame is further subdivided into successive bursts and the control messages are transferred in these bursts.

5. Apparatus according to claim 3, wherein the downlink frame is further subdivided into successive bursts and the control messages are transferred in the first of these bursts.

6. Apparatus according to claim 2, wherein the control messages are at least one of uplink map, downlink map, downlink channel descriptor and uplink channel descriptor.

7. Apparatus according to claim 2, wherein the subscriber stations are mobile subscriber stations.

8. Apparatus according to claim 2, wherein the frame structure is at least one of orthogonal frequency-division multiplexing and orthogonal frequency-division multiple access.

9. Apparatus according to claim 2, wherein the frames can be transmitted with at least one of time division duplex or frequency division duplex.

10. Apparatus according to claim 2, wherein the control messages each having an original content of a particular size which is condensed by replacing the original content with a temporary connection identifier of smaller size.

11. Apparatus according to claim 10, wherein the connection identifier has a lifetime that is the number of frames for which the allocation is to be repeated.

12. Apparatus as claimed in claim 2, said apparatus being provided in a base station.

13. Apparatus comprising:
    means for providing at least part of each of a plurality of frames, said at least part of each frame having sets of information and control messages, wherein at least some of the control messages allocate which set of information corresponds to which one of a plurality of subscriber stations and wherein at least one of the control messages is a code which allocates the location of the sets of information within said at least part of each frame and also the number of frames for which the allocation is to be repeated.

14. A method comprising:
    defining at least part of each of a plurality of frames, said at least part of each frame having sets of information and control messages, wherein at least some of the control messages allocate which sets of information correspond to which one of a plurality of subscriber stations and wherein at least one of the controlled messages is a code which allocates the location of the sets of information within said at least part of each frame and also the number of frames for which the allocation is to be repeated.

15. A computer program embodied on a tangible computer readable medium, said computer program controlling a processor to perform:
    defining at least part of each of a plurality of frames, said at least part of each frame having sets of information and control messages, wherein at least some of the control messages allocate which sets of information correspond to which one of a plurality of subscriber stations and wherein at least one of the controlled messages is a code which allocates the location of the sets of information within said at least part of each frame and also the number of frames for which the allocation is to be repeated.

* * * * *